United States Patent
Hoescheler et al.

(10) Patent No.: US 11,938,975 B2
(45) Date of Patent: *Mar. 26, 2024

(54) ARRANGEMENT FOR DRIVING A LOCOMOTIVE HAVING VARIOUS ENERGY-PROVISION SYSTEMS

(71) Applicant: SIEMENS MOBILITY GMBH, Munich (DE)

(72) Inventors: Bernhard Hoescheler, Erlangen (DE); Stefan Lauer, Erlangen (DE)

(73) Assignee: Siemens Mobility GmbH, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/193,831

(22) Filed: Mar. 31, 2023

(65) Prior Publication Data

US 2023/0234620 A1    Jul. 27, 2023

Related U.S. Application Data

(63) Continuation of application No. 17/299,929, filed as application No. PCT/EP2019/078248 on Oct. 17, 2019.

(30) Foreign Application Priority Data

Dec. 4, 2018    (DE) .................... 10 2018 220 931.6

(51) Int. Cl.
*B61C 7/04*    (2006.01)
*B61C 17/06*    (2006.01)

(52) U.S. Cl.
CPC ............... *B61C 7/04* (2013.01); *B61C 17/06* (2013.01)

(58) Field of Classification Search
CPC .................................. B61C 7/04; B61C 17/06
See application file for complete search history.

(56) References Cited

U.S. PATENT DOCUMENTS 5,735,215 A    4/1998    Tegeler
9,193,362 B2    11/2015    Foege et al.
(Continued)

FOREIGN PATENT DOCUMENTS

CN    108068833 A    5/2018
DE    19718425 A1    7/1998
(Continued)

OTHER PUBLICATIONS

Christoph Schaetzer et al.: "Last Mile—die neue Funktion der TRAXX AC3 Lokomotiven", [Last Mile—Actual Generation of Traxx AC3 Locomotives], EB-Elektrische Bahnen, Div-Deutscher Industrieverlag, DE, vol. 110, No. 8-9, Aug. 1, 2012 (Aug. 1, 2012), pp. 432-4442, XP001526070, ISSN: 0013-5437—English abstract.

*Primary Examiner* — Robert J McCarry, Jr.
(74) *Attorney, Agent, or Firm* — Laurence A. Greenberg; Werner H. Stemer; Ralph E. Locher

(57) ABSTRACT

An arrangement for driving a locomotive has various energy-provision systems. The locomotive contains a main energy-provision system as the main system and a drive system. Energy provided by the main system is supplied to the drive system as drive power and is used by the drive system for moving the locomotive. A railroad car carries at least one additional energy-provision system as an auxiliary system. The auxiliary system is used in a manner which is temporally offset from the main system in order to supply drive power to the drive system. Components which can be used by both the main system and the at least one auxiliary system are implemented only once and are used jointly by both the main system and the auxiliary system. Components which are used exclusively by the auxiliary system are arranged on the railroad car.

13 Claims, 1 Drawing Sheet

(56) References Cited

U.S. PATENT DOCUMENTS

| | | | |
|---|---|---|---|
| 9,975,435 | B2 | 5/2018 | Salomonsen |
| 2006/0005739 | A1 | 1/2006 | Kumar |
| 2009/0293759 | A1 | 12/2009 | Schmitz |
| 2014/0033945 | A1 | 2/2014 | Foege et al. |
| 2015/0027339 | A1 | 1/2015 | Lamba |
| 2016/0264152 | A1 | 9/2016 | Semple et al. |
| 2022/0048540 | A1* | 2/2022 | Hoescheler ............ B61C 17/06 |
| 2023/0234621 | A1* | 7/2023 | Hoescheler ............ B61C 17/06 105/26.05 |

FOREIGN PATENT DOCUMENTS

| | | |
|---|---|---|
| DE | 10064973 A1 | 6/2002 |
| DE | 102008056008 A1 | 4/2010 |
| DE | 102012012720 A1 | 12/2012 |
| DE | 102017201408 A1 | 8/2018 |
| EP | 1186497 A1 | 3/2002 |
| EP | 3184349 A1 | 6/2017 |

\* cited by examiner

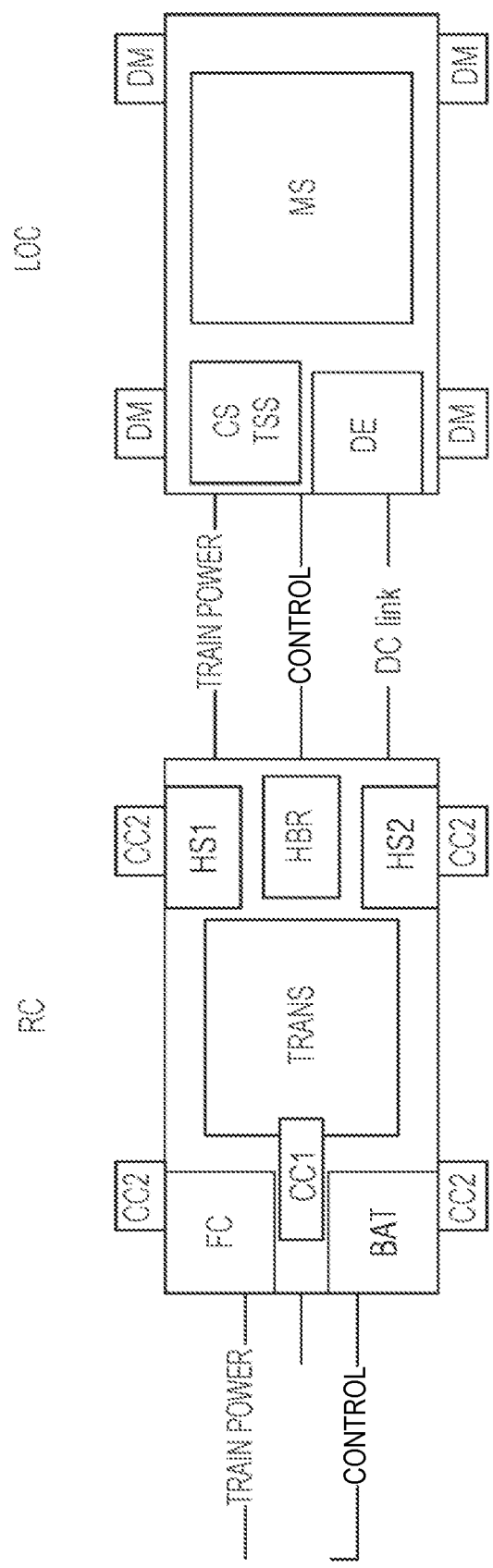

ARRANGEMENT FOR DRIVING A LOCOMOTIVE HAVING VARIOUS ENERGY-PROVISION SYSTEMS

CROSS-REFERENCE TO RELATED APPLICATION

This application is a continuation of application Ser. No. 17/299,929, filed Jun. 4, 2021, which was a § 371 national stage filing of international application No. PCT/EP2019/078248, filed Oct. 17, 2019, which designated the United States; the application also claims the priority, under 35 U.S.C. § 119, of German patent application No. DE 10 2018 220 931.6, filed Dec. 4, 2018; the prior applications are herewith incorporated by reference in their entirety.

BACKGROUND OF THE INVENTION

The invention relates to an arrangement for driving a locomotive having various energy-provision systems.

Locomotives having various energy-supply systems are known, said systems each being arranged independently of one another in the locomotive and operated independently of one another.

A dual-power locomotive uses, for example, as a first energy-supply system a diesel engine which drives an electrical generator coupled to the diesel engine. Electric power generated thereby is transmitted to electric drive motors which then drive the locomotive.

In parallel thereto, a second energy-supply system, for example an electrical one, is present on the locomotive. The locomotive takes electric power from a high-voltage overhead line, via a current collector or pantograph, and passes it to a transformer via a main circuit breaker. The transformer converts the high voltage down to a lower medium voltage. The medium voltage is then in turn fed, via a so-called H-bridge and an inverter arranged downstream from the latter, to electric drive motors of the locomotive which then drive the locomotive.

Locomotives of this type can be used flexibly because, being rail vehicles having a collector and a diesel engine, they can travel on electrified stretches of track, non-electrified stretches of track, and over the transition regions with almost no interruption.

There is, however, a disadvantage that a rail vehicle of this type has a high overall mass and a large volume owing to the two energy-supply systems, configured in parallel, and their components.

The number of energy-generation systems which can be used is limited by virtue of the specified restrictions on the volume of the rail vehicle and its permitted overall mass. Two and a maximum of three energy-supply systems are generally provided per rail vehicle or per rail vehicle trainset.

In order to use various energy-supply systems at different times, it is also known to couple together a first locomotive which has, for example, a diesel drive and a second locomotive which has, for example, a collector and three-phase motors and to employ these coupled locomotives as a trainset. Depending on the section of track, one of the two locomotives is then used as the traction vehicle, for example for railroad cars, etc.

Owing to the weight, the rolling resistance, and the mass of the locomotive which is not required in each case, there is an increase in both the power consumption and the maintenance cost. Lastly, although the trainset solution is easy to implement, it entails high operating costs.

SUMMARY OF THE INVENTION

The object of the present invention is therefore to provide an improved solution for a locomotive which permits the cost-effective use of various energy supplies.

This object is achieved by the features of the claimed invention. Advantageous developments are given in the dependent claims.

The invention relates to an arrangement for driving a locomotive having various energy-provision systems, wherein the locomotive includes a main energy-provision system as the main system, and a drive system. Energy provided by the main system is fed as drive power to the drive system and used by the latter to move the locomotive. A railroad car includes at least one further energy-provision system as an ancillary system, wherein the ancillary system is used to feed drive power to the drive system at different times from the main system. Components which can be used both by the main system and by the at least one ancillary system have a single design and are used jointly both by the main system and by the at least one ancillary system. Components which can be used exclusively by the at least one ancillary system are arranged on the railroad car.

The energy provided or converted by the energy-provision system is fed as drive power to the drive system and used by the latter to drive or move the locomotive.

A first energy-provision system thus forms a so-called main energy-provision system or main system.

A further energy-provision system that is intended to be used (in parallel with but) at different times from the main energy-provision system forms a so-called first ancillary energy-provision system or first ancillary system.

Further energy-provision systems which in turn are intended to be used in parallel with but at different times from the main energy-provision system and the first ancillary energy-provision system then correspondingly form a second, third, etc ancillary energy-provision system or ancillary system.

In a preferred embodiment, the components of the main system are arranged completely on the locomotive. Autonomous operation of the locomotive is thus enabled because all the required components (energy provision or energy conversion and driving) are then a constituent part of the locomotive.

Components which can be used both by the main system and by the respective ancillary systems have a single design.

In a preferred development, these components are, as described at the beginning, arranged on the locomotive itself.

In an alternative embodiment, these components are arranged at least partially on the railroad car described below.

Components which can be used only by the respective ancillary systems are arranged on a railroad car.

The railroad car is preferably coupled directly to the locomotive and they both thus effectively form as it were a twin unit.

Alternatively, the locomotive can also be connected indirectly to the railroad car by extended cables which pass through further (utility) railroad cars.

Common energy-provision systems with components and their distribution between the locomotive and the railroad car are listed below, where ancillary systems are concerned:

AC Mode:
Arrangement on the railroad car:
Current collector or pantograph
Main circuit breaker
Transformer
H-bridge
(Partial) intermediate circuit
Arrangement on the locomotive:
(Partial) intermediate circuit
Inverter or frequency inverter for the driving motors
Three-phase asynchronous motor(s) as driving motor(s)
Cooling system for driving motor(s)
Compressed-air braking system
Compressor system for the compressed-air braking system
DC Mode:
Arrangement on the railroad car:
Current collector or pantograph
Main contact breaker or high-speed circuit breaker
Boost converter (optional, converts the DC voltage into the desired intermediate circuit voltage)
(Partial) intermediate circuit
Arrangement on the locomotive:
(Partial) intermediate circuit
Inverter or frequency inverter for the driving motors
Three-phase asynchronous motor(s) as driving motor(s)
Cooling system for driving motor(s)
Compressed-air braking system
Compressor system for the compressed-air braking system
Diesel Mode:
Arrangement on the railroad car:
Diesel engine for generating electricity
Generator for generating the required electric power or energy
Inverter for adapting the energy to the intermediate circuit (voltage adaptation)
(Partial) intermediate circuit
Arrangement on the locomotive:
(Partial) intermediate circuit
Inverter or frequency inverter for the driving motors
Three-phase asynchronous motor(s) as driving motor(s)
Cooling system for driving motor(s)
Compressed-air braking system
Compressor system for the compressed-air braking system
Energy Storage Mode:
Arrangement on the railroad car:
Energy stores, for example storage batteries, hydrogen stores with a fuel cell, ultracaps, etc
If required, energy converters producing electrical energy (for example, when using a fuel cell)
If necessary, inverters for adapting the energy storage voltage into a desired intermediate circuit voltage
(Partial) intermediate circuit
Arrangement on the locomotive:
(Partial) intermediate circuit
Inverter or frequency inverter for the driving motors
Three-phase asynchronous motor as driving motor
Cooling system for driving motors
Compressed-air braking system
Compressor system for the compressed-air braking system In an overview provided by way of example, which implies no limitation, a configuration is described in detail below in which a locomotive is intended to travel over both an electrified stretch of track with AC high voltage and a non-electrified stretch of track.

In a preferred embodiment, a diesel drive is chosen as the main system and an AC drive as the first ancillary system.

The required components are preferably and as follows distributed between the locomotive, on the one hand, and the railroad car, on the other hand:

Components of the main system, i.e., the diesel drive, are arranged on the locomotive. These components are used partially both by the main system and by the ancillary system. They are specifically:
Diesel engine
Generator for generating the required electric power
(Partial) intermediate circuit
Inverter
Three-phase asynchronous motor(s) as driving motor(s)
Cooling system for driving motors
Compressed-air braking system
Compressor system for the compressed-air braking system All the remaining components of the ancillary system are arranged on the railroad car. These components are used only by the ancillary system. They are:
Current collector or pantograph
Main circuit breaker
Transformer
H-bridge
(Partial) intermediate circuit A choice is made by the locomotive between the main system and the ancillary system depending on the section of track. The respective required components are connected to one another via a selection circuit in order to operate the locomotive depending on the section of track.

The locomotive thus includes all the required components for autonomous diesel-based operation in a predetermined first stretch of track.

In a preferred embodiment, any (partial) intermediate circuits are configured so that they can be isolated, for example, via disconnectors.

In a preferred development, connection points for any (partial) intermediate circuits are arranged at one end or at both ends of the locomotive so that connection from outside the locomotive is enabled.

An operational locomotive/railroad car twin unit is created via appropriately configured electrical connections of the partial intermediate circuits of the railroad car and the locomotive. The energy-provision system of the railroad car is thus connected to the drive components of the locomotive. Energy is provided by the railroad car selectively via one or more different installed energy-provision systems.

In a preferred development, free space or volumes within the railroad car which are not required and the size of which is generally determined by the operator are used for purposes other than energy provision. This free space can be used, for example, for transporting goods, mail, or passengers.

The free space can furthermore be used for additional amenities (for example, dining car service, VIP lounge, work area for business travelers) in order to make the whole twin unit consisting of the locomotive and the railroad unit more economically efficient.

By virtue of the spatial assignment of the individual components to the locomotive or the railroad car and owing to the ability of the components to be used more than once, the present invention enables a saving in cost, volume, and weight.

Maintenance and operating costs are reduced or saved, compared with the known prior art.

The weight of the railroad car to be pulled is much less than the weight of a second locomotive, as has been required hitherto, such that a saving can furthermore be made in energy costs and wear and tear on the infrastructure (tracks) can be reduced.

The invention optimizes costs and intended application by virtue of a modular structure.

The present invention is explained in detail below by way of example with the aid of a drawing.

BRIEF DESCRIPTION OF THE DRAWING

The sole FIGURE of the drawing shows a preferred exemplary embodiment of the invention having a main energy-provision system (main system) and having a total of four auxiliary energy-provision systems (ancillary systems).

DETAILED DESCRIPTION OF THE INVENTION

A locomotive LOC carries all the components of a main system MS which is, for example, a diesel drive.

The locomotive LOC is driven with the aid of driving motors DM which are likewise integrated into the locomotive LOC.

The locomotive LOC furthermore carries components which are required for its autonomous operation as a diesel locomotive. These are, for example, a train safety system TSS, a control system CS, and drive equipment DE.

A railroad car RC coupled to the locomotive LOC carries components of the four ancillary systems.

These are:
A first ancillary system HS1 which takes the form of an AC energy-provision system at a first frequency,
A second ancillary system HS2 which takes the form of a DC energy-provision system,
A third ancillary system FC which provides energy using a fuel cell, and
A fourth ancillary system BAT which provides energy using a battery.

The first ancillary system HS1 takes power from a rail power network with the aid of a current collector CC1. The current collector CC1 is, for example, a current collector or pantograph which can be extended and retracted and is arranged on the roof of the railroad car RC.

The second ancillary system HS2 takes power from a rail power network with the aid of a current collector CC2. The current collector CC2, four of which are present in this case, is, for example, a lateral current collector which can be folded out and withdrawn.

The two ancillary systems HS1 and HS2 jointly use a transformer or reactor TRANS which likewise forms part of the railroad car RC.

A controller HBR is moreover provided for the ancillary systems HS1 and HS2 which is likewise shared and forms a further part of the railroad car RC.

The controller HBR here takes the form of an H-bridge for the first ancillary system HS1. The controller HBR takes the form of a boost/buck converter for the second ancillary system HS2.

Traction energy or power generated by the four ancillary systems HS1 to HS4 passes from the railroad car RC to the locomotive LOC via a DC link cable.

A further CONTROL cable communicates control signals reciprocally between the railroad car RC and the locomotive LOC.

The railroad car RC is connected detachably or permanently coupled to the locomotive LOC.

The locomotive LOC can be supplied with DC voltage from the railroad car RC with the aid of the DC link cable.

For this purpose, required components such as, for example, a current converter, a transformer, smoothing equipment, etc are arranged on the railroad car RC in order to generate the energy required for the driving. They are alternatively attached to the locomotive LOC.

The energy required can also be used to supply an onboard network of the locomotive LOC.

The invention claimed is:

1. A locomotive drive arrangement, the arrangement comprising:
    a locomotive having a drive system and a main energy-provision system being a main system, said main system being configured to feed drive power to said drive system for use by said drive system to move said locomotive;
    a railroad car having at least one further energy-provision system being an ancillary system, said ancillary system being configured to feed drive power to said drive system at different times from said main system;
    components to be used both by said main system and by said at least one ancillary system each being formed only once as a common component configured to be used jointly by said main system and by said at least one ancillary system; and
    components to be used exclusively by said at least one ancillary system being disposed on said railroad car;
    components required by said main system being disposed entirely on said locomotive to enable autonomous operation of said locomotive;
    said main system being a diesel drive and said at least one ancillary system being an AC drive;
    said railroad car carrying the following components of said ancillary system: a current collector, a main circuit breaker, a transformer, and an H-bridge;
    said locomotive carrying the following components of said main system: a diesel motor, a generator connected to said diesel motor for generating required electrical power, and an inverter; and
    an intermediate circuit between said H-bridge and said inverter being arranged optionally and at least partially on said railroad car or on said locomotive.

2. The arrangement according to claim 1, wherein said at least one ancillary system is one of a plurality of energy-provision systems arranged on said railroad car.

3. The arrangement according to claim 1, wherein said railroad car is coupled directly to the locomotive.

4. The arrangement according to claim 1, wherein said locomotive is connected indirectly to said railroad car via extended cables which pass through further railroad cars.

5. The arrangement according to claim 1, wherein said drive system of said locomotive has components selected from the group consisting of a three-phase asynchronous motor forming a driving motor, a cooling system for said driving motor, a compressed-air braking system, and a compressor system for said compressed-air braking system.

6. The arrangement according to claim 1, wherein said ancillary system is a DC-based ancillary system, and:
    said components of said ancillary system on said railroad car include a current collector, a main circuit breaker, and an optional boost converter;

said components of said main system on said locomotive include an inverter or frequency inverter for a driving motor of said locomotive; and an intermediate circuit between said main circuit breaker or H-bridge and said driving motor inverter is arranged optionally and at least partially on said railroad car or on said locomotive.

7. The arrangement according to claim 1, wherein said at least one ancillary system is based on a diesel mode, and:

said components of said ancillary system on said railroad car include a diesel engine, a generator, connected to the diesel engine and configured for generating a required electric power or energy, and an optional inverter for adapting the electric power or energy to an intermediate circuit;

said components of said main system on said locomotive include an inverter or a frequency inverter for driving motors of said locomotive;

said intermediate circuit which is arranged between the generator or the optional inverter and said driving motor inverter is arranged optionally and at least partially on the railroad car or on the locomotive.

8. The arrangement according to claim 1, wherein said at least one ancillary system is based on an energy storage mode, and:

said components of said ancillary system on said railroad car include an energy storage device;

said railroad car optionally includes an energy converter configured to convert energy received from said energy storage device into electrical energy;

said railroad car optionally includes an inverter for adapting stored energy into a desired intermediate circuit voltage;

said components of said main system of said locomotive include an inverter or a frequency inverter for driving motors of said locomotive; and an intermediate circuit is arranged between said energy storage device and said inverter is arranged optionally and at least partially on said railroad car or on said locomotive.

9. The arrangement according to claim 8, wherein said energy storage device includes at least one component selected from the group consisting of a storage battery, a hydrogen store with a fuel cell, and ultracapacitors.

10. The arrangement according to claim 1, which comprises a disconnector disposed to isolate an intermediate circuit connected between said drive system and said ancillary system.

11. The arrangement according to claim 1, which comprises disconnectors disposed to isolate any of a plurality of partial intermediate circuits connected between said drive system and said ancillary system.

12. The arrangement according to claim 1, which comprises connection points for any of a plurality of intermediate circuits or partial intermediate circuits arranged on one or both ends of said locomotive to enable a connection from outside said locomotive.

13. The arrangement according to claim 1, wherein said railroad car is formed with free volume that is not required for carrying said ancillary system or components thereof and said free volume is configured for transporting goods, for transporting mail, for transporting passengers, or as a service area.

* * * * *